United States Patent [19]

Bühler

[11] 4,455,660
[45] Jun. 19, 1984

[54] INCLINED ARRANGEMENT OF THE SUPPORT SURFACES OF A FURNACE BODY AND FURNACE LID FOR ELECTRIC ARC FURNACES

[75] Inventor: Karl Bühler, Nussbaumen, Switzerland

[73] Assignee: BBC Brown, Boveri & Company, Ltd., Baden, Switzerland

[21] Appl. No.: 413,963

[22] Filed: Sep. 1, 1982

[30] Foreign Application Priority Data

Sep. 2, 1981 [CH] Switzerland ............... 5642/81

[51] Int. Cl.³ .............................................. F27D 3/00
[52] U.S. Cl. ..................................... 373/71; 373/73; 373/81
[58] Field of Search .................. 373/71, 72, 73, 75, 373/78, 79, 81, 84; 432/157, 160, 241; 266/265, 267, 270

[56] References Cited

U.S. PATENT DOCUMENTS

| | | | |
|---|---|---|---|
| 1,392,965 | 10/1921 | Priwer | 373/79 |
| 1,658,072 | 2/1928 | Bernard | 373/71 |
| 1,818,239 | 8/1931 | Moore | 373/81 X |
| 2,396,663 | 3/1946 | Kuehlthau et al. | 373/73 X |
| 2,469,740 | 5/1949 | Moore | 373/73 |
| 2,529,319 | 11/1950 | Thys | 373/73 |

FOREIGN PATENT DOCUMENTS 437333 10/1935 United Kingdom ............ 373/79

*Primary Examiner*—Roy N. Envall, Jr.
*Attorney, Agent, or Firm*—Oblon, Fisher, Spivak, McClelland & Maier

[57] ABSTRACT

In order to move a furnace body (1) and a furnace lid (2) relative to one another by approximately one furnace body width, the separating surfaces of the furnace body (1) and furnace lid (2) are inclined relative to the horizontal.

The direction of movement when the furnace body (1) is moved then runs in the direction of the angle opening and, when the furnace lid (2) is moved, the movement is in the opposite direction.

In order to reduce the frictional forces between the separating surfaces (4, 5) of the furnace body (1) and furnace lid (2) and to ensure that the relative movement of the furnace body (1) and the furnace lid (2) occurs under defined conditions, the furnace lid (2) is supported on at least two support points on the furnace body (1) on which roller tracks (6) are arranged together with support rollers (7) which roll on the tracks for a certain travel. When opening the furnace body (1) and furnace lid (2), the weight of the furnace lid (2) is by this mechanism first partially, then completely transferred to the lid carrying and swivelling device (10, 42) and, when closing the furnace body (1) and furnace lid (2), the weight of the furnace lid (2) is similarly first transferred partially and then completely transferred to the furnace body (1).

15 Claims, 6 Drawing Figures

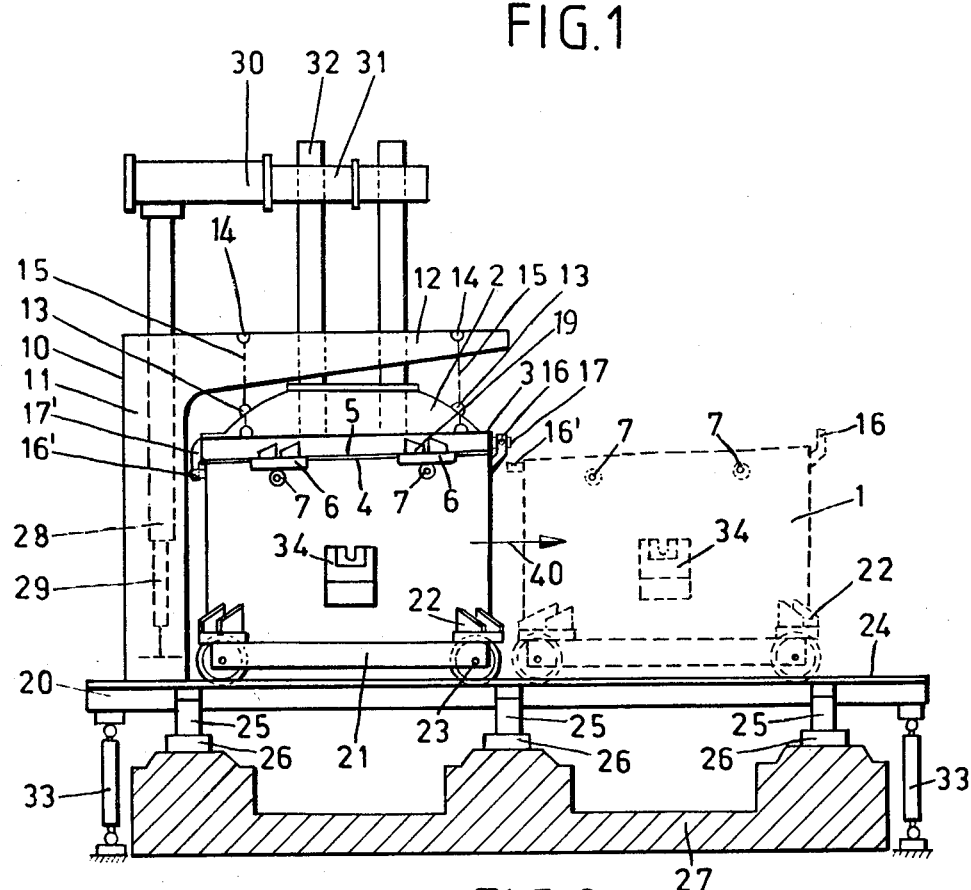
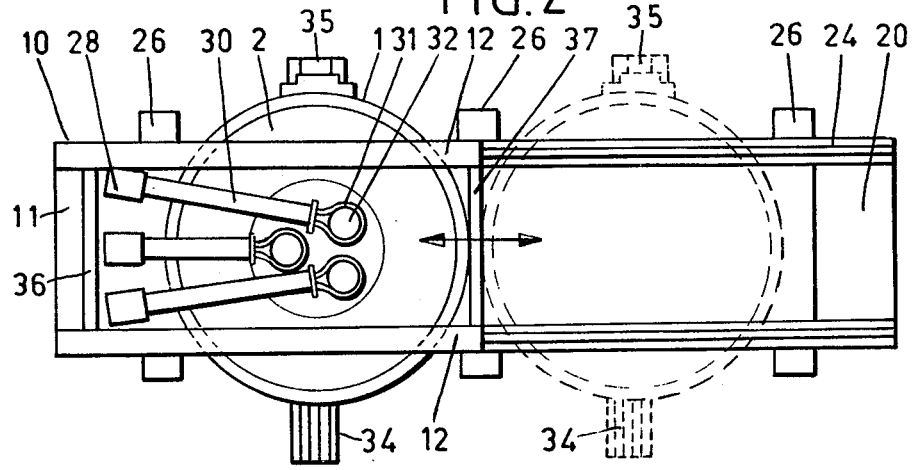

INCLINED ARRANGEMENT OF THE SUPPORT SURFACES OF A FURNACE BODY AND FURNACE LID FOR ELECTRIC ARC FURNACES

BACKGROUND OF THE INVENTION

1. Field of the Invention

The invention concerns an electric arc furnace with a furnace body, a furnace lid and a lid carrying and swivelling device such that the furnace body and the furnace lid can be moved relative to one another by approximately one furnace body width.

2. Description of the Prior Art

In order to satisfactorily feed an electric arc furnace with solid charge, its body must be exposed. A conventional way of doing this is first to raise the furnace lid vertically upwards from the furnace body by means of a lid raising and swivelling device, the so-called upper furnace, and then swivel it horizontally to the side. Another method, which has recently been increasingly used in steel mill practice, is to displace the furnace body in the tipping direction or normal to the tipping direction out of the furnace lid area after the lid has been raised using a lid raising device.

In the Russian paper with the title "Calculation and Design of Electric Furnaces" by S. Kacewitsch; Technical-Scientific Publishers Moscow, Leningrad 1959, a furnace is described on page 422 whose body is movable in the tipping direction.

In this technical concept, as in all the others where the lid is raised, a lid raising device is necessary with the associated parts of the equipment, such as, for example, valve controls, mechanical power transmission devices, locking systems, etc. Particularly in the case of furnaces with medium to large capacities, the lid raising devices must have very large dimensions if they are to be capable of raising the relatively heavy lids. Corresponding to the dimensions and the design complexity, the proportion of the investment costs represented by a lid raising device for the furnace unit is high.

SUMMARY OF THE INVENTION

The object of the invention is intended to overcome the drawbacks of the prior art.

The invention, as it is characterized in the claims, solves the problem of producing an electric arc furnace in which the furnace body and the furnace lid are movable relative to one another by approximately one furnace body width in a simple and economical manner, as follows: the separating surfaces of the furnace body and the furnace lid are inclined to the horizontal and the direction of movement when the furnace body is moved is in the direction of the angle opening and, when the furnace lid is moved, is in the opposite direction.

The advantage achieved by the invention may be seen mainly in the fact that the complex lid raising device is dispensed with and that only a device for carrying the lid is necessary. The construction of this device is simple and its dimensions are relatively small because no lifting work has to be done.

This lid carrying device is combined with a swivelling device for the case where the furnace body remains stationary in the working position for charging of the furnace and the lid is swivelled out of the body area.

Corresponding to one aspect of the invention, means are provided on the furnace body and the furnace lid so that, during partial movement when opening the furnace body and the furnace lid, the weight of the furnace lid is first partially transferred to the upper furnace and, after opening, completely transferred to the upper furnace and, before closing the furnace body with the furnace lid, the weight of the furnace lid is first partially transferred to the furnace body and, after closing of the furnace body with the furnace lid, the weight of the furnace lid is completely transferred to the furnace body. The advantage of this extension of the invention is to be seen in the fact that the weight of the furnace lid is successively transferred from the furnace body to the lid carrying and swivelling device when opening the furnace body and the furnace lid. Similarly, on closing the furnace body and the furnace lid, the weight of the furnace lid is transferred successively from the lid carrying and swivelling device to the furnace body. In this manner, damage to the furnace body, furnace lid and lid carrying and swivelling device is avoided.

According to another aspect of the present invention, the furnace lid is supported completely on the support means after the furnace body and the furnace lid have been closed, with a gap retained between the separating surfaces of the furnace body and the furnace lid.

A defined opening and closing of the furnace body and furnace lid are achieved by this means with substantial exclusion of the need to overcome frictional forces, which would appear if the separating surfaces of the furnace body and the furnace lid were in direct contact.

According to a further aspect of the present invention, the support means consist of at least two roller tracks and support rollers rolling on them.

According to an additional aspect of the present invention, the roller tracks run substantially parallel to the direction of movement of the furnace body or of the furnace lid.

According to a yet further aspect of the present invention, the support rollers run substantially parallel to the direction of movement of the furnace body or furnace lid on the roller tracks.

The advantageous effect according to the further extensions in accordance with the present invention consists in the fact that the horizontal displacement forces for the opening or closing of the furnace body and furnace lid can be reduced.

Corresponding to a further aspect of the present invention, the roller tracks run parallel to the separating surfaces of the furnace body and furnace lid.

By this aspect, the advantageous effect according to other aspects of the invention is further increased. The angle of inclination of the separating surfaces of the furnace body and furnace lid is, however, so dimensioned that independent movement of the furnace lid without the application of a horizontal force is not possible.

According to another aspect, the roller tracks are attached to the lid ring of the furnace lid and the support rollers are attached to the furnace body. The advantage lies in the fact that foreign bodies, for example, splashed iron and/or slag particles can not settle on the roller track.

According to an additional aspect, the support rollers are fastened to the lid ring of the furnace lid and the roller tracks are fastened to the furnace body. This arrangement has the advantage that the support rollers are protected from thermal effects because the lid ring of the furnace lid is cooled.

According to a further aspect, a guide device and a locking device are arranged on the furnace body and on the furnace lid.

According to an additional aspect, the guide device includes guide straps of the furnace body and guide straps of the furnace lid.

According to another aspect the locking device includes holes in the guide straps of the furnace body and the furnace lid and at least one locking pin.

The guide and locking devices according to the present invention guarantee that furnace body and furnace lid return to a precisely centered position after each completed closing procedure.

DESCRIPTION OF THE DRAWINGS

Various other parts, features and attendant advantages of the present invention will be more fully appreciated as the same becomes better understood from the following detailed description when considered in connection with the accompanying drawings in which like reference characters designate like or corresponding parts throughout the several views and wherein:

FIG. 1 shows a schematic representation of a frontal view of an electric arc furnace according to a first variant of an illustrative embodiment used as an example, the furnace body being movable in the horizontal direction out of the lid area and the furnace lid being arranged to be stationary;

FIG. 2 shows a schematic plan view according to FIG. 1;

DETAILED DESCRIPTION OF THE PREFERRED EMBODIMENTS

Figure 3:
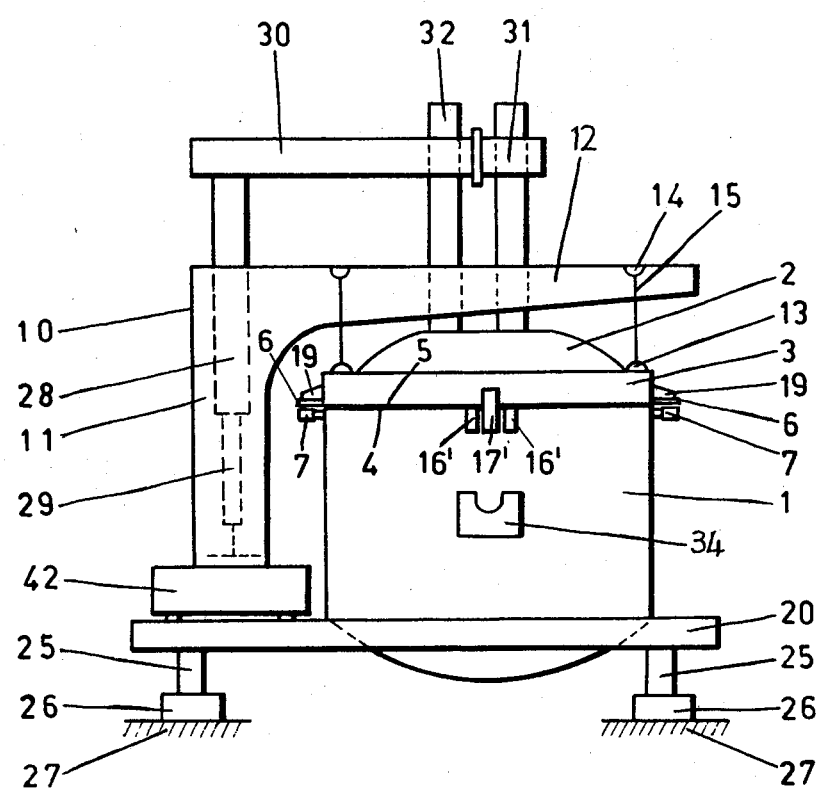
FIG. 3 shows a schematic representation of a frontal view of an electric arc furnace according to a second embodiment used as an example, the furnace lid being arranged to be swivellable in the horizontal direction out of the body area and the furnace body being arranged to be stationary.

A furnace body 1 is shown in two positions in FIG. 1. The left-hand position, drawn full, is the working position for the melting process. The right-hand position, shown dotted, is the position of the furnace body 1 for the charging process. In FIG. 1, the inclination of the separating surfaces 4, 5 of the furnace body 1 and the furnace lid 2 relative to the horizontal is easily seen. The direction of movement of the furnace body 1 occurs in the direction of the angle opening relative to the horizontal, in accordance with arrow direction 40, whereas the furnace lid 2 remains stationary.

Four roller tracks 6, of which only two are visible, are arranged on the lid ring 3 of the furnace lid 2. The roller tracks 6 are supported on support rollers 7, which are attached to the furnace body 1. For precise positioning and locking of the furnace body 1 and the furnace lid 2, guide straps 16, 17 are provided on the furnace lid 2 and on the furnace lid 2. The lid 2 is carried by the lid carrying device 10 by means of carrying cables 15, which are connected with the lid 2 through eyes 13 on the lid ring 3 and with the lid carrying device 10 by eyes 14 on the lid carrying arm 12. The carrying cables 15 are tensioned by an adjustment device (not shown), before the movement of the furnace body 1 in order to avoid swinging of the furnace lid 2 and/or a shock-type transfer of the lid weight to the lid carrying device 10.

The mode of functioning of the components during the opening and closing procedure of furnace body 1 and furnace lid 2 is more precisely described in connection with FIG. 5.

In FIG. 1, the furnace body 1 rests on a support structure 21, which is movable by wheels 23 on rails 24, which are arranged on the platform 20. Consoles 22 are attached to the support structure 21 for mechanical reinforcement. In this example, the platform 20 is supported by three roller rings 25 which in turn can roll on three cradle beams 26.

The cradle beams 26 are attached to a foundation 27. A lid carrying device 10 is attached on the platform 20 and consists of a lid carrying column 11 and a lid carrying arm 12.

In a known manner, electrode adjustment columns 28 are connected so as to be hydraulically movable in the vertical direction using associated adjustment cylinders 29.

The electrode adjustment columns 28 carry electrode carrying arms 30 at whose outer ends the electrodes 32 are held in electrode holders 31.

Hydraulic cylinders 33, which are connected with the platform 20 at the left-hand and right-hand ends respectively, cause the tipping movements of the electric arc furnace in order to pour the melt from the pouring spout 34 and for deslagging the melt.

Most of the parts described in FIG. 1 may also be seen in FIG. 2 which illustrates a schematic plan view in accordance with FIG. 1.

In FIG. 2 and in the other Figures, the same functional parts are indicated by the same reference numbers as in FIG. 1.

The connecting bars 36, 37 of the lid carrying arm 12 and the slag door 35 are visible in FIG. 2.

FIG. 3 shows a schematic representation of the front view of an electric arc furnace according to a second variant of an illustrative embodiment used as an example, the furnace lid 2 being swivellable in the horizontal direction and the furnace body being arranged to be stationary. The lid carrying device 10 is connected to a rotating bracket 42, which is arranged to be mounted rotatably on the platform 20 so that the furnace lid 2 can be simultaneously carried and swivelled outwardly.

Roller tracks 6, on which support rollers 7 can roll, are likewise fastened to the furnace lid 2 at the lid ring 3. The support rollers 7 are attached to the furnace body 1. Reinforcement ribs 19 are provided for mechanical reinforcement of the roller tracks 6. The inclination of the separating surfaces 4, 5 of the furnace body 1 and the furnace lid 2 are not visible in FIG. 3 but are visible in FIG. 4, which shows a schematic side view of an electric arc furnace according to FIG. 3.

Figure 4:
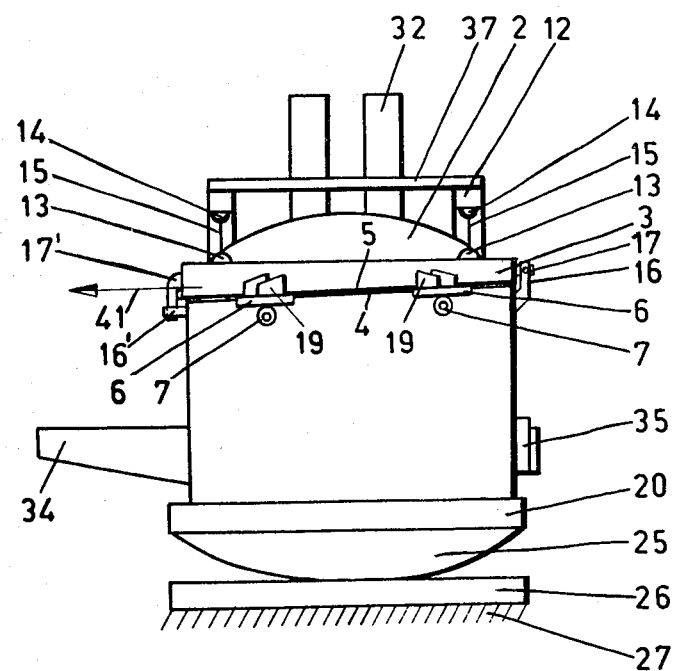
FIG. 4 shows a schematic side view of an electric arc furnace according to FIG. 3.

The inclination of the separating surfaces 4, 5 of the furnace body 1 and the furnace lid 2 relative to the horizontal may be easily seen in FIG. 4. The direction of movement of the furnace lid 2 occurs in the direction in which the angle closes relative to the horizontal, according to arrow direction 41, whereas the furnace body 1 is arranged to be stationary on the platform 20. When the furnace body 1 and furnace lid 2 are opened, the lid carrying and swivelling device (10, 42) takes over completely the weight of the furnace lid 2 and the furnace lid 2 is swivelled out of the body area hanging free on the carrying cables 15. Before closing the furnace body 1 with the furnace lid 2, the weight of the furnace lid 2 is at least partially and, after closing, completely transferred to the furnace body 1.

Figure 5:
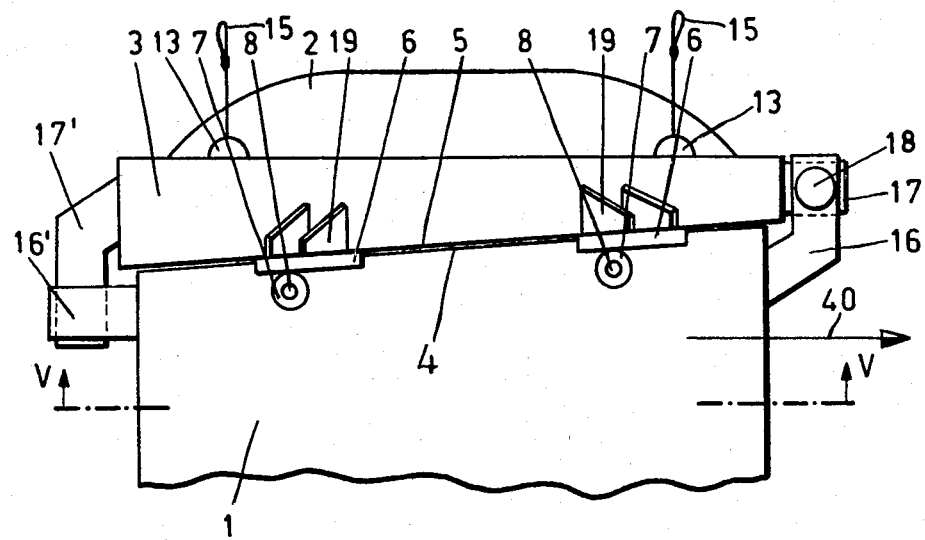
FIG. 5 shows a magnified part front view of a furnace body and a furnace lid according to FIG. 1 or FIG. 3.

FIG. 5 shows a magnified partial front view of a furnace body 1 and a furnace lid 2 in accordance with FIG. 1 or FIG. 3.

All the functional parts which are not necessary for the direct understanding of the invention are omitted. The full weight of the furnace lid 2 is supported on the furnace body 1 only at four contact points, at which roller tracks 6 are arranged on which support rollers 7 roll during a partial movement. Only two roller tracks 6 and the associated support rollers 7 are visible in FIG. 5. The separating surfaces 4, 5 of furnace body 1 and furnace lid 2, which are a small distance apart, may be easily seen.

The roller tracks 6 are attached to the lid ring 3 of the furnace lid 2 with reinforcement ribs 19.

The support rollers 7 are connected with the furnace body 1 by roller axles 8, on which they are rotatably mounted.

The working position of the electric arc furnace is shown in FIG. 5. In this position, the guide straps 16, 16' of the furnace body 1 are in engagement with the guide straps 17, 17' of the furnace lid 2. Furnace body 1 and furnace lid 2 are locked by a locking device 18, 44, 45, which is formed by holes 44, 45 in the guide straps 16, 17 of the furnace body 1 and the furnace lid 2 together with the locking pin 18.

Carrying cables 15, of which only a part may be seen in FIG. 5, are fastened to eyes 13 on the lid ring 3 of the furnace lid 2. The angle of inclination of the separating surfaces 4, 5 of the furnace body 1 and furnace lid 2 relative to the horizontal is so dimensioned that the vertical component of the weight of the furnace lid 2 is greater than the horizontal component and hence the furnace lid 2 cannot be moved without the application of a horizontal force.

Figure 6:
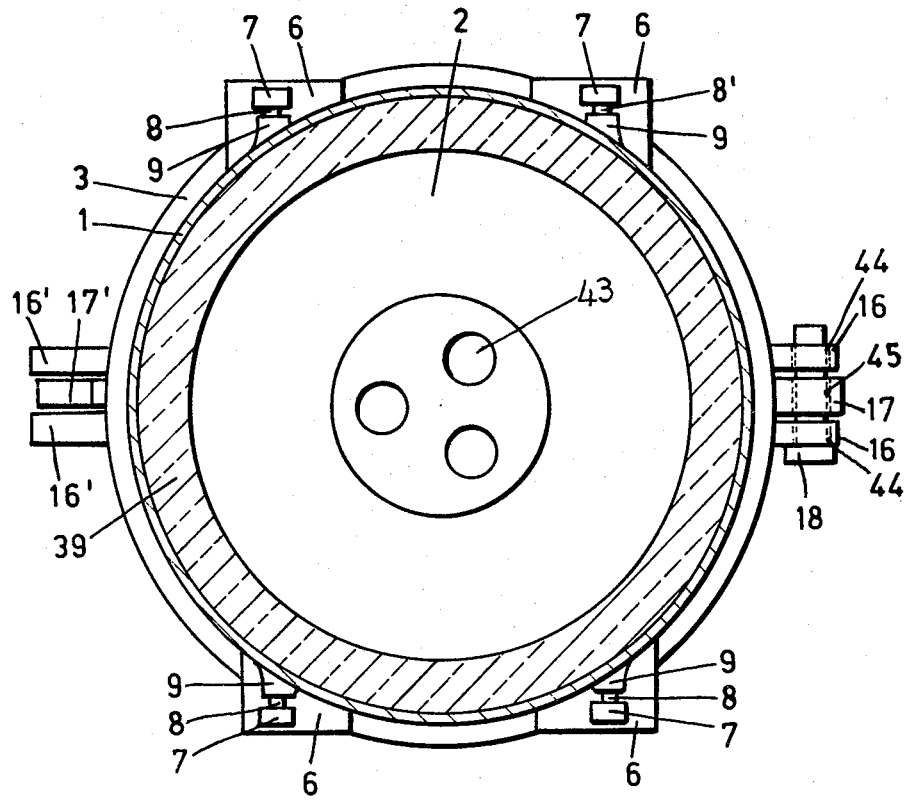
FIG. 6 shows a horizontal section according to FIG. 5.

FIG. 6 shows a horizontal section in accordance with FIG. 5. The roller tracks 6 are arranged on the underside of the lid ring 3 which extends outwardly beyond the furnace body 1. The roller axles 8, which connect the rotatably mounted support rollers 7 with the furnace body 1, are fastened in protruding eyes 9 on the furnace body 1.

The opening and closing processes of the furnace body 1 or the furnace lid 2 are described below using FIGS. 5 and 6.

The description is based on variant 1 in accordance with FIG. 1. In this case, the furnace body 1 is displaced horizontally out of the lid area whereas the furnace lid 2 is arranged to be stationary. With the arrangement according to the invention shown in FIG. 5, it is of course also possible to apply the second embodiment, in which the furnace lid 2 is swivelled horizontally out of the body area and the furnace body 1 is arranged to be stationary.

The opening process of furnace body 1 and furnace lid 2 is as follows. After release of the locking pin 18 from the holes 44, 45 of the guide straps 16, 17, a horizontal force, in accordance with arrow direction 40, is applied to the furnace body 1, for example by a cable winch not shown in FIG. 5. The furnace body 1 now moves in the direction of the opening of the angle which is formed by the inclination of the separating surfaces 4, 5 of the furnace body 1 and furnace lid 2 relative to the horizontal. The angle of inclination relative to the horizontal is 5 to 15 degrees. Since the roller tracks 6 run parallel to the separating surfaces 4, 5, ie. they are also inclined, whereas the support rollers 7 run parallel to the horizontal, the support rollers 7 will only roll on the roller tracks 6 during a partial movement and will then leave the roller tracks on further movement of the furnace body 1 in the arrow direction 40. After the separation of the support rollers 7 and the roller tracks 6, the whole weight of the furnace lid 2 is transferred by the carrying cables 15 to the lid holding device 10. The lid holding device 10 is not shown in FIG. 5. It is obvious that the carrier cables 15 are tensioned before the opening process of furnace body 1 and furnace lid 2. The tensioning of the carrying cables is carried out by an adjustment device or cable tensioning device not shown in FIG. 5. The tensioning of the carrier cables 15 is necessary to avoid swinging of the furnace lid 2 or a shock-type transfer of the lid weight onto the lid holding device 10 during the opening process of furnace body 1 and furnace lid 2. Vertical lifting of the furnace lid 2 by the lid holding device 10 before the opening process of furnace body 1 and furnace lid 2 is also avoided by the adjustment device. After the separation of furnace body 1 and furnace lid 2, the furnace body 1 is moved completely out of the lid area and the furnace body 1, which is now exposed, can be recharged while the furnace lid 2 is held freely hovering on the lid holding device 10.

The closing process of furnace body 1 and furnace lid 2 is as follows. After completion of the charging of the furnace body 1, the furnace body 1 is moved back in the opposite direction to arrow direction 40, again by cable winch, which is not shown in FIG. 5. After the support rollers 7 come in contact with the roller tracks 6, the lid weight is at least partially, and after a partial movement completely, taken over by the support rollers 7 and the carrying cables 15 and the lid carrying device 10 are correspondingly successively unloaded until the furnace lid 2 rests completely on the furnace body 1 after the closing of the furnace body 1 and the furnace lid 2. During closing of furnace body 1 and furnace lid 2, the guide strap 17' of the furnace lid 2 is led in between the guide straps 16' of the furnace body 1, and the furnace body 1 is moved back until the holes 44 of the locking straps 16 of the furnace body 1 are lined up with the hole 45 of the locking strap 17 of the furnace lid 2 and the locking pin 18 can be inserted. The closing process is now ended. The furnace body 1 is once again in the initial position and precisely centered relative to the furnace lid 2 and the melting process can begin afresh.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An apparatus for movement of a furnace lid of an electric arc furnace relative to a body of said furnace, comprising:
   at least one lid carrying means operatively associated with said furnace lid; and
   means for moving the furnace body and the furnace lid relative to one another by approximately one furnace body width, the separating surfaces of the furnace body and the furnace lid being inclined to a horizontal plane by the same angle and direction of movement upon movement of the furnace body in a first direction of the angle opening and, when the furnace lid is moved, in a second direction opposite said first direction.

2. An apparatus for movement of a furnace lid of an electric arc furnace relative to a body of said furnace as claimed in claim 1, further comprising support means disposed on the furnace body and furnace lid for partially transferring, during partial movement when opening the furnace body and the furnace lid, the weight of the furnace lid and lid carrying means, for completely transferring the weight of the furnace lid after opening to the lid carrying means, and for at least partially transferring the weight of the furnace lid to the furnace body and completely transferring the weight of the furnace lid to the furnace body after closing the furnace body.

3. An apparatus for movement of a furnace lid of an electric arc furnace relative to a body of said furnace as claimed in claims 1 or 2, wherein said support means further comprises means for completely supporting the furnace lid after the furnace body and furnace lid have been closed and for retaining a gap between a separating surface portion of the furnace body and a separating surface portion of the furnace lid.

4. An apparatus for movement of a furnace lid of an electric arc furnace relative to a body of said furnace as claimed in claim 2, wherein said support means further comprises at least a first and second roller track mounted on said furnace lid and first and second support rollers mounted on said furnace body for rolling engagement with said first and second roller tracks respectively.

5. An apparatus for movement of a furnace lid of an electric arc furnace relative to a body of said furnace as claimed in claim 4, wherein the roller tracks further comprise roller tracks running substantially parallel to the direction of movement of the furnace body or furnace lid.

6. An apparatus for movement of a furnace lid of an electric arc furnace as claimed in claims 4 or 5, wherein the support rollers further comprise support rollers running substantially parallel to the direction of movement of the furnace body or furnace lid on the roller tracks.

7. An apparatus for movement of a furnace lid of an electric arc furnace relative to a body of said furnace as claimed in claim 4, wherein the roller tracks further comprise roller tracks running parallel to separating surfaces of said furnace body and furnace lid.

8. An apparatus for movement of a furnace lid on an electric arc furnace relative to a body of said furnace as claimed in claim 4, wherein said furnace lid further comprises a lid ring and the roller tracks are attached to the lid ring of the furnace lid and the support rollers are rotatably attached to the furnace body.

9. An apparatus for movement of a furnace lid of an electric arc furnace relative to a body of said furnace as claimed in claim 2, wherein the furnace lid further comprises a lid ring and the support rollers are fastened to the lid ring of the furnace lid and the roller tracks are fastened to the furnace body.

10. An apparatus for movement of a furnace lid of an electric arc furnace relative to a body of said furnace as claimed in claim 1, further comprising guide means and locking means operatively associated with the furnace body and furnace lid, respectively.

11. An apparatus for movement of a furnace lid of an electric arc furnace relative to a body of said furnace as claimed in claim 10, wherein the guide means further comprises guide straps operatively associated with the furnace body and guide straps operatively associated with the furnace lid.

12. An apparatus for movement of a furnace lid of an electric arc furnace relative to a body of said furnace as claimed in claim 10, wherein the locking device includes holes formed in the guide straps of the furnace body and furnace lid and at least one locking pin insertable in said holes.

13. An apparatus for movement of a furnace lid of an electric arc furnace relative to a body of said furnace as claimed in claim 4, wherein the roller tracks further comprise roller tracks running substantially parallel to the direction of movement of the furnace lid.

14. An apparatus for movement of a furnace lid of an electric arc furnace relative to a body of said furnace as claimed in claims 4 or 5, wherein the support rollers further comprise support rollers running substantially parallel to the direction of movement of the furnace lid on the roller tracks.

15. An apparatus for movement of a furnace lid of an electric arc furnace relative to a body of said furnace, said lid and said body having corresponding separating surfaces, comprising:

a platform for supporting said body;

a device for carrying said lid wherein said device further comprises a lid carrying column; a lid supporting arm connected to said column; a rotating bracket connected to said column; a plurality of lug members mounted on said arm; a plurality of eye members mounted on said lid; and a plurality of carrying cables interconnecting said lug members with said eye members; and means operatively associated with said platform for moving said lid and said body relative to one another by approximately one furnace body width wherein said corresponding separating surfaces have the same angle relative to horizontal such that direction of movement of said body and said lid are in directions of angle opening and closing, respectively.

* * * * *